United States Patent [19]
Sklarchuk

[11] 3,988,163
[45] Oct. 26, 1976

[54] SODIUM-MIXTURE OF METAL HALIDES, SULFUR BATTERY

[75] Inventor: Jack C. Sklarchuk, Trenton, N.J.

[73] Assignee: ESB Incorporated, Philadelphia, Pa.

[22] Filed: June 9, 1975

[21] Appl. No.: 584,987

[52] U.S. Cl. .................................. 429/103; 429/199
[51] Int. Cl.² ............................................ H01M 43/00
[58] Field of Search ................ 136/6 F, 6 FS, 6 LF, 136/20, 83 R, 83 T, 100 R, 137, 153

[56] References Cited
UNITED STATES PATENTS

| | | | |
|---|---|---|---|
| 3,635,765 | 1/1972 | Greenberg ....................... | 136/83 R |
| 3,751,298 | 8/1973 | Senderoff ........................... | 136/6 F |
| 3,877,984 | 4/1975 | Werth .................................. | 136/6 F |
| 3,879,224 | 4/1975 | Farrington et al. ............... | 136/83 R |

*Primary Examiner*—Anthony Skapars
*Attorney, Agent, or Firm*—Anthony J. Rossi

[57] ABSTRACT

A secondary battery utilizing a molten sodium negative reactant, mixture of metal halides, sulfur positive reactant melt having a carbon powder dispersed within the melt, a molten sodium haloaluminate electrolyte, and a selectively ionically-conductive separator positioned between the negative and positive reactants.

8 Claims, 3 Drawing Figures

SODIUM-MIXTURE OF METAL HALIDES, SULFUR BATTERY

BACKGROUND OF THE INVENTION

1. Field of the Invention

This invention relates to secondary electrochemical cells and more particularly to secondary electrochemical cells utilizing a molten sodium negative reactant, a solid ionically-conductive separator, a molten sulfur and mixture of molten metal or metal-like halides positive reactant, and a molten sodium haloaluminate electrolyte.

2. Description of the Prior Art

It may be explained here that U.S. Pat. No. 3,404,035 discloses a secondary battery that in its fully charged condition has a molten sodium negative reactant, a molten sulfur positive reactant and a solid electrolyte-separator of beta alumina or its derivative disposed between the positive and negative reactants. In its discharged or partially discharged condition, it has an additional electrolyte comprising a sodium polysulfide ($Na_2S_x$) on the positive reactant side of the beta alumina separator.

The potential of this battery is typically in the range of from about 2 to 2.2 volts and the operating temperature of this battery is in the range of 265° to 350° C. in order to keep the discharge products, $Na_2S_x$, molten at all times. It is recognized by those skilled in the art, however, that operation of this type battery at about or above 265° C. cannot be carried out without attendant problems. For example, $Na_2S_x$ is a strong oxidizing agent at these elevated temperatures and will tend to effect rapid corrosion and chemical attack of containers, current collectors, seals and separators of the battery, thus seriously reducing the useful life of the battery.

In U.S. Pat. No. 3,877,984, there is described a battery which utilizes a metal chloride positive reactant, e.g. antimony chloride, in contact with a molten alkali metal chloroaluminate electrolyte, e.g. sodium chloroaluminate. The negative reactant of this battery is an alkali metal; e.g. sodium, and a solid ionically-conductive separator, e.g. beta alumina, is positioned between the positive and negative reactants. This battery can operate at a temperature as low as from about 150° to about 225° C. and greatly reduce the corrosion problems since sodium chloroaluminate at temperatures of from about 150° to about 225° C. is not a strong oxidizing agent. Additionally, the voltage potential of this battery approaches or exceeds 3 volts.

In a United States patent application filed on even date herewith entitled "Sodium-Aluminum Halide, Sulfur Battery", which is assigned to the same assignee as the instant application and which is hereby incorporated herein by reference, there is disclosed a novel secondary battery which utilizes a molten sodium negative reactant, a molten sulfur and molten aluminum halide, e.g. aluminum chloride, positive reactant in contact with a molten sodium haloaluminate (molten sodium halide-aluminum halide) e.g. molten sodium chloroaluminate electrolyte. This battery can operate at a temperature as low as from about 150° to about 225° C. and thus also greatly reduces the corrosion and chemical attack problems associated with sodium-sulfur batteries of the type described above with reference to U.S. Pat. No. 3,404,035. The potential of the battery described in this copending application approaches or exceeds 2.66 volts.

One of the differences between the battery described in U.S. Pat. No. 3,877,984 and the copending application just described is that the major discharge products of the battery of U.S. Pat. No. 3,877,984 are antimony metal and sodium chloride, while in the battery of the copending application described above, the major discharge products are, for example, sodium chloride and aluminum sulfide. The antimony metal and sodium chloride discharge products have no deleterious effect on the beta alumina separator or other components of the cell. In early cells constructed in accordance with the teaching of said copending application there appeared to be a continual degradation of the battery with cycling. I speculated that the aluminum sulfide, formed on discharge, attacked the beta alumina separator and/or current collectors of the cell, or at least formed a resistive phase around them.

Working on the assumption tht one of the reaction products of the battery of the copending application described above, namely aluminum sulfide, was attacking the beta alumina, or at least forming a solid resistive layer at its surface, I hypothesized that perhaps by adding a metal, such as for example antimony, to the positive reactant melt of this battery, then the major discharge product would be antimony sulfide or a mixed antimony aluminum salt rather than aluminum sulfide, and thus it would be possible to cycle the cell with no degradation. I subsequently discovered that my assumption was incorrect, the cell of said copending application, in fact, was not degrading in the manner speculated but, I had discovered a novel and, in some respects, a superior cell.

Cells were constructed according to the teaching of the copending application described above, and antimony was added to the positive reactant in chloride form ($Sb\ Cl_3$) in the ratio of 5 parts $Sb\ Cl_3$ to 2 parts of sulfur. This battery can operate at a temperature as low as from about 150° to about 225° C. The potential of this novel battery ranges between approximately 2.5 and 3.5 volts.

SUMMARY OF THE INVENTION

This invention is directed to a novel secondary battery comprising in combination a molten sodium negative reactant, a sulfur and mixture of metal halides positive reactant melt, a carbon powder dispersed within the positive reactant melt, a solid member separating the negative reactant and the positive reactant, and a molten electrolyte on the positive reactant side of the solid member. The solid member which separates the negative and positive reactants is selectively-ionically conductive to sodium cations. The molten electrolyte on the positive side of the solid member comprises a molten sodium haloaluminate.

DESCRIPTION OF THE INVENTION

Figure 1:
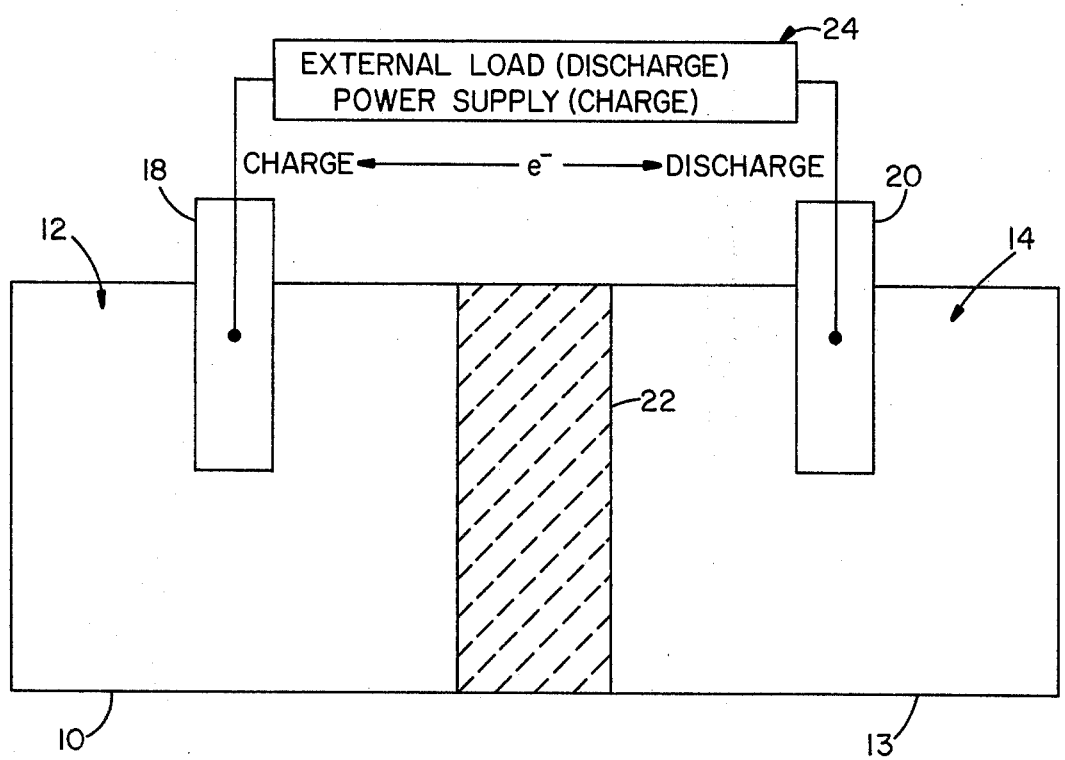
FIG. 1 is a schematic, cross-sectional view of a simple cell in accordance with this invention.

In the operation of the secondary or rechargeable battery of this invention, a high potential is achieved by utilizing a molten sodium negative reactant and a molten sulfur and molten metal halides positive reactant melt having a carbon powder dispersed therein, separating the two reactants by means of a solid member which is selectively-ionically conductive to sodium cations and maintaining on the positive reactant side of the solid separating member a molten electrolyte comprising molten sodium haloaluminate.

In accordance with this invention, the negative reactant or reductant is sodium maintained above its melting point when the cell is in operation. The negative reactant is initially heated by any conventional means such as induction heating by electrical means, direct heating, or indirect heat exchange with a suitable heated fluid exchange means. The negative reactant functions as a conductor through which electrons flow to the external circuit during discharge.

The positive reactant of the present invention comprises molten sulfur and a molten mixture of metal halides. The specific metal halides selected for use will be determined by such factors as the end use to which the battery is to be put; the economics involved, e.g. the cost of starting materials; the desired operating pressure of the cell; and the specific sodium haloaluminate electrolyte selected for use in the battery. One criterion must however be satisfied by the metal halides selected. They must be soluble to some extent in the sodium haloaluminate electrolyte of the battery.

So long as this criterion is satisfied, the selection of the specific metal halides to be utilized becomes a practical question rather than a critical one, i.e. depending on economics, end use and the like. Useful materials from which the positive reactant metal halides can be formed include metals at least as noble as aluminum and metal-like elements. By metal-like elements, it is meant elements such as boron, silicon, selenium arsenic, tellurium, and antimony which are also known as metalloids and which are intermediate in properties between typical metals and non-metals. Thus as used in this specification and the claims which follow, the term metalloids is meant to include boron, silicon, selenium, arsenic, tellurium and antimony. The preferred metal halides for use in combination with sulfur in the positive reactant melt are aluminum chloride and antimony chloride.

The solid member which separates the negative reactant and the positive reactant in the instant invention must be selectively-ionically-conductive to sodium cations. Materials suitable for use as the solid separator include glass, beta aluminas and other cation conductive crystalline and/or glassy materials that are resistant to the negative reactant and have satisfactorily low resistivities. The preferred separator comprises a beta alumina cationically-conductive crystalline structure consisting essentially of a structural lattice and sodium cations which are mobile in relation to said lattice. The solid separator member may be prepared by any art known means, see for example, U.S. Pat. No. 3,535,163, so long as the useful end product is selectively ionically-conductive to sodium cations.

The electrolyte utilized in the present invention makes possible a substantial reduction in the operating temperature of molten sulfur batteries as compared with those presently known and used in the art. For example, the operating temperature of the normal molten sodium-molten sulfur secondary battery wherein the molten cathodic electrolyte is an ionized combination of sodium and sulfur, i.e. ions of sodium polysulfide, $Na_2S_5$, the operating temperature is recognized to be well about 200° and closer to 300° C., the melting temperature of sodium pentasulfide being as high as 265° C. In marked contrast, the battery of the present invention utilized an electrolyte on the positive reactant side of the solid separating member which comprises molten sodium haloaluminate and permits the operation of the instant battery to be carried out at temperatures of about 150° to about 225° C. The advantages of operating at a reduced temperature are of course apparent, e.g. reduced corrosion, increased battery life, and reduced cost of containers and seals, e.g. silicone rubber may be used as a negative gasket seal.

By the term molten sodium haloaluminate as used herein is meant materials which include sodium halides, as for example, chlorides, bromides, fluorides, or iodides or sodium, and aluminum halides, for example chlorides, bromides, fluorides or iodides of aluminum. All of these metal halides will form the corresponding sodium haloaluminate electrolytes of the invention. The preferred electrolyte is sodium chloroaluminate.

In the battery of the present invention, the positive reactant (sulfur and a mixture of metal halides) is mixed with the metal haloaluminate by any means in the art, e.g. it is possible to mix sulfur, sodium chloride, aluminum chloride and antimony chloride together with the positive reactant and heat the resultant mix until sodium chloroaluminate and the positive reactant are formed within the cell. It should be noted that while the battery of this invention is a sodium-mixed metal halides sulfur battery, the metal halide reactants which are present in the cell, i.e. present in the sodium haloaluminate-positive reactant melt within this cell, may be added initially as the metals themselves, picking up halide ions from the ionized sodium haloaluminate upon charging. Therefore, even though metals were added initially, the positive reactant of the cell will comprise sulfur and a mixture of metal halides in the charged state.

Referring now to FIG. 1, a single cell secondary battery according to the invention is diagrammatically shown having a negative reactant cell compartment 10 which may be made of any suitable material or materials which are not attacked by molten sodium metal at the operating temperature of the cell (about 150° to 225° C.), e.g. carbon steel, aluminum, certain ceramics, certain heat and chemical resistant polymers, a suitable glass or an alpha alumina or derivative thereof, all thermally insulated with fiberglass, rockwool, or other insulation. Inside compartment 10 is a molten sodium negative reactant 12. Inside a positive reactant compartment 13 is an electrolyte-sulfur mixture of metal halides positive reactant melt 14, e.g. sodium chloroaluminate-sulfur, aluminum chloride and antimony chloride melt.

A carbon powder is in the melt 14 and serves the purpose of a dispersed current collector.

The positive reactant compartment 13 may be made of any suitable material such as glass, ceramic, tungsten and the like. Current collectors 18 and 20 are disposed within the negative and positive reactant compartments 10 and 13, respectively, and may be made of any suitable material such as for example, tungsten wire, carbon rods and the like. A solid separating member 22 is disposed between the compartments 10 and 13. The requirements of the separating member 22 have been described above. The current collectors 18 and 20 provide means for connecting the cell with an external circuit 24 which closed the circuit of the cell. The external circuit 24 may include any suitable utilization device or load, voltmeter, ammeter, etc. which have not been shown other than as indicated in FIG. 1.

A better understanding of the battery in accordance with the invention can be obtained from the following examples which are intended to be merely illustrative of the invention and not in limitation thereof.

EXAMPLES

The following information applies to all cells tested in the examples unless otherwise indicated. Also, unless otherwise indicated, all quantities are by weight.

1. Makeup of Cells

The cells comprised a Pyrex glass positive container, a carbon steel negative container and a beta alumina separator disc. The negative seal was silicone rubber, and the positive seal was Teflon. The negative current collector was the steel sodium container. The positive current collector varied as to type and configuration, as described in the examples, but in all cases it was sealed to the Pyrex glass with a Monel Gyralok fitting containing Teflon ferrules. In all cases the carbon was Cabot Vulcan XC-72R. This carbon has a relatively low surface area of approximately 200 square meters/gram.

EXAMPLE I

Cell Assembly

A tungsten coil current collector was sealed to a ¼ inch glass tube then inserted into the positive Pyrex glass container. The cell was then assembled and sealed to the beta-alumina separator. The following positive ingredients were then added in powder form, after which the Pyrex container was sealed with a Monel Swagelok:

0.5 grams of sulfur
0.5 grams of XC-72R conductive carbon
0.5 grams of Na Cl
2.5 grams of Al $Cl_3$
1.15 grams of Sb $Cl_3$ The cell was heated to and held at 210° C then put on discharge.

| Cycle | Mode | Current | Polarization | Capacity |
|---|---|---|---|---|
|  | C = charge<br>D = discharge | (MA) | (MV) | (A-hrs.) |
| 1 | D | 50 | 190 | 0.75 |
|  | C | 50 | 190 | 0.55 |
| 2 | D | 50 | 190 | 0.60 |
|  | C | 50 | 190 | 0.62 |
| 3 | D | 50 | 190 | 0.62 |
|  | C | 50 | 190 | 0.63 |
| 4 | D | 50 | 190 | 0.63 |
|  | C | 50 | 190 | 0.64 |
| 5 | D | 50 | 190 | 0.63 |
|  | C | 50 | 190 | 0.63 |

Figure 2:
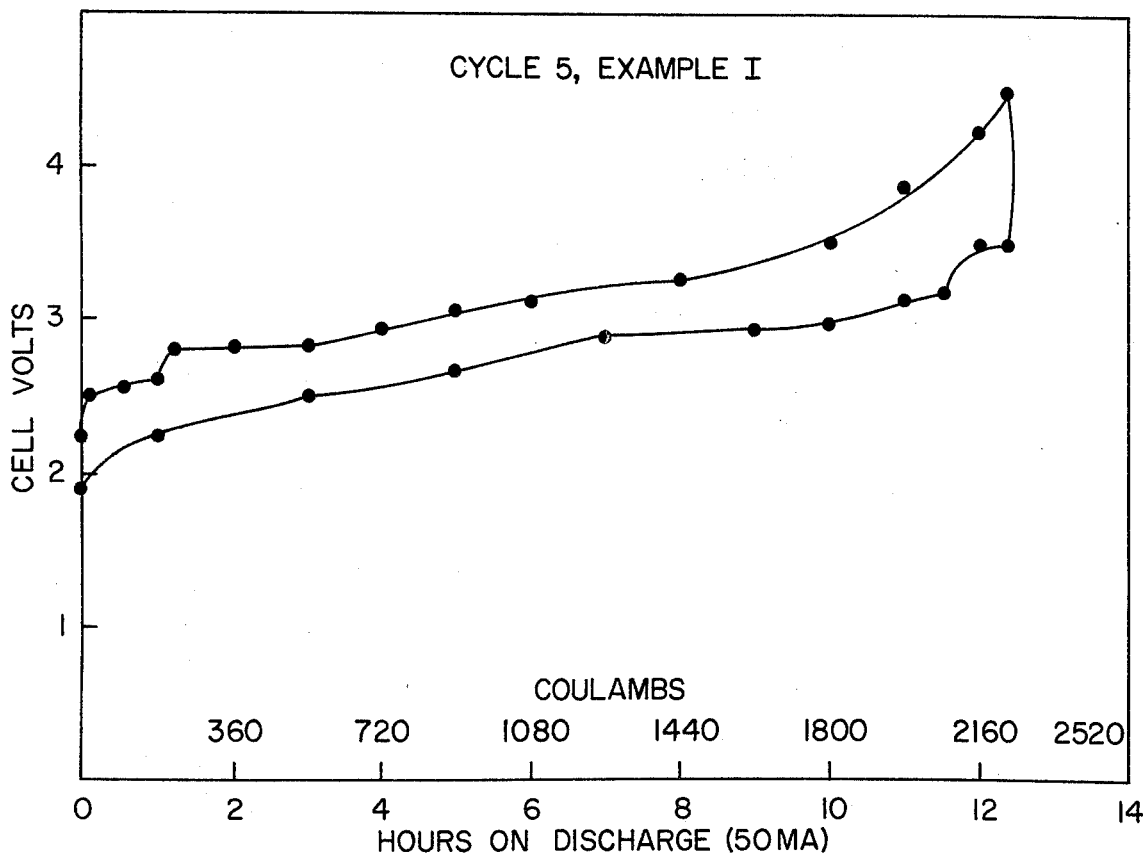
FIGS. 2 and 3 are graphic representations of the chargedischarge cycles of cells of this invention.

The capacity of this cell equalled 1250 joules per gram of positive mix. The turnaround efficiency was 88%. Also, see FIG. 2 for charge discharge cycle of this cell.

EXAMPLE II

The cell assembly procedure was the same as described in Example I. The following positive ingredients were added in powder form:

0.5 grams of sulfur
0.75 grams XC-72R conductive carbon
1.25 grams of Na Cl
4.50 grams of Al $Cl_3$
1.25 grams of Sb $Cl_3$ The cell was heated to 210° C and discharged.

| Cycle | Mode | Current | Polarization | Capacity |
|---|---|---|---|---|
|  | C = charge<br>D = discharge | (MA) | (MV) | (Amp.-hrs.) |
| 1 | D | 50 | 205 | 0.78 |
|  | C | 50 | 205 | 0.70 |
| 2 | D | 50 | 205 | 0.71 |
|  | C | 50 | 205 | 0.69 |
| 3 | D | 50 | 205 | 0.69 |
|  | C | 50 | 205 | 0.69 |
| 4 | D | 50 | 205 | 0.69 |
|  | C | 50 | 205 | 0.69 |
| 5 | D | 50 | 205 | 0.69 |
|  | C | 50 | 205 | 0.69 |

The capacity of this cell equalled 850 joules/gram of positive mix. The turnaround efficiency was 85%.

EXAMPLE III

This cell was assembled and tested as in the previous two examples except that liquid titanium tetrachloride was used instead of antimony trichloride.

The positive ingredients were:

0.25 grams of sulfur
0.75 grams of XC-72R conductive carbon
1.00 grams of Na Cl
4.00 grams of Al $Cl_3$
1.27 grams (0.75 cc) of Ti $Cl_4$

| Cycle | Mode | Current | Polarization | Capacity |
|---|---|---|---|---|
|  | C = charge<br>D = discharge | (MA) | (MV) | (Amp-hrs.) |
| 1 | D | 50 | 100 | 0.95 |
|  | C | 50 | 100 | 0.95 |
| 2 | D | 50 | 100 | 0.65* |
|  | C | 50 | 100 | 0.60* |
| 3 | D | 50 | 100 | 0.64* |
|  | C | 50 | 100 | 0.65* |

*Low cutoff voltage was raised from 1.62 to 2.3v. The original cutoff voltage for cycle 1 would have maintained 0.95 amp hours.

Figure 3:
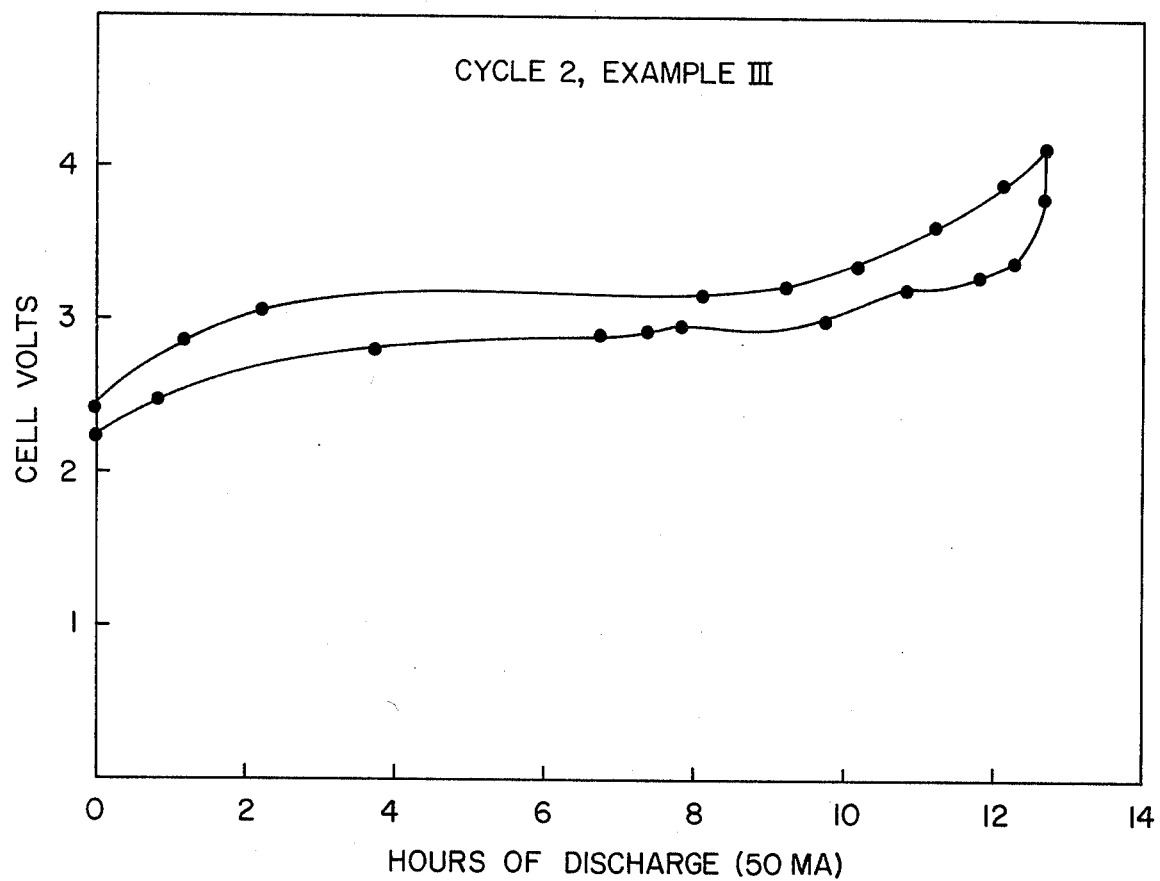

The capacity of this cell equalled 1020 joules/grams of positive mix. The turnaround efficiency was 90%. Also, see FIG. 3 for charge discharge cycle of this cell.

EXAMPLE IV

A cell can be assembled as in Example I. The following positive ingredients can be added:

0.5 grams of sulfur
0.5 grams of XC-72R conductive carbon
0.9 grams Na Br
5.0 grams Al $Br_3$
1.8 grams Sb $Br_3$ Such a cell would behave similarly to the cell described in Example I.

The foregoing examples and detailed descriptions have been given for clarity of understanding only and no unnecessary limitations are to be understood therefrom. The invention is not limited to exact details shown and described for obvious modifications will occur to one skilled in the art.

Having thus described our invention, we claim:
1. A secondary battery comprising in combination:
   a. a molten sodium negative reactant;

b. a positive reactant comprising molten sulfur and a mixture of halides said mixture of halides selected from the group consisting of halides of metals at least as noble as aluminum, halides of metalloids and mixtures thereof;

c. a solid member separating the negative and positive reactants, said member being selectively ionically conductive to sodium cations;

d. a molten sodium halide-aluminum halide electrolyte on the positive reactant side of the solid member;

e. carbon powder dispersed within the molten sulfur and mixture of metal halides; and f. a current collector disposed in each the positive and negative reactants.

2. A battery according to claim 1 wherein the operating temperature of the battery is from about 150° to 225° C.

3. A battery according to claim 1 wherein the solid member is beta alumina.

4. A battery according to claim 1 wherein the positive reactant comprises molten sulfur and mixture of metal halides.

5. A battery according to claim 4 wherein the positive reactant comprises molten sulfur and a mixture of aluminum halide and at least one metal halide selected from the group consisting of antimony halide, arsenic halide, tellurium halide, titanium halide and mixtures thereof.

6. A battery according to claim 5 wherein the positive reactant comprises molten sulfur and wherein the aluminum halide is selected from the group consisting of chlorides and bromides of aluminum and the metal halide selected is antimony halide, said antimony halide being selected from the group consisting of chlorides and bromides of antimony.

7. A battery according to claim 1 wherein the sodium halide-aluminum halide electrolyte is selected from the group consisting of chlorides and bromides of sodium and aluminum and mixtures thereof.

8. A battery according to claim 1 wherein the positive reactant comprises molten sulfur and a mixture of aluminum chloride and antimony chloride and wherein molten sodium chloride-aluminum chloride is the electrolyte.

* * * * *